April 11, 1939.    G. L. WALKER    2,153,854
VALVE FOR TORCHES
Filed May 29, 1937

INVENTOR
George L. Walker
BY
ATTORNEY

Patented Apr. 11, 1939

2,153,854

UNITED STATES PATENT OFFICE 2,153,854

VALVE FOR TORCHES

George L. Walker, Jersey City, N. J., assignor to Air Reduction Company, Incorporated, New York, N. Y., a corporation of New York Application May 29, 1937, Serial No. 145,404

9 Claims. (Cl. 251—132)

This invention relates to torch construction, and particularly to valve actuating means by which an operator controls the supply of gas to the torch tips.

In oxygen cutting torches it is customary to provide quick-acting valves for controlling the cutting oxygen so that an operator can shut off the oxygen and turn it on again by merely shifting a trigger or other lever located at a convenient place on the torch.

It is an object of this invention to provide a torch construction having an improved valve actuating means. The embodiments of the invention which will be illustrated and described include quick-acting valves of oxygen cutting torches.

An important feature of the invention is a correlation of the stuffing-box through which a valve rod passes and the supporting or retaining means for the trigger, lever, or other manually operated member, which makes the stuffing-box readily accessible for adjustment or replacing of the packing. The advantage of such a construction is a substantial saving in time and gas because torches having valve operating means overlying the stuffing-boxes and which must be taken off before access can be had to the stuffing-box, require considerable time and trouble to effect an adjustment of the packing, and in actual practice the inconvenience involved is apt to result in neglect of the adjustment and operation of the torch with a leaky stuffing-box.

This invention provides a torch construction which is simple and inexpensive, obtains quick and convenient accessibility to the packing around the valve rod, and effects accurate adjustment of the clearance or "lost motion" between the valve and its actuating means.

Other objects, features and advantages of the invention will appear or be pointed out as the specification proceeds.

In the accompanying drawing, forming a part hereof:

Figures 1, 2, 3, 4:
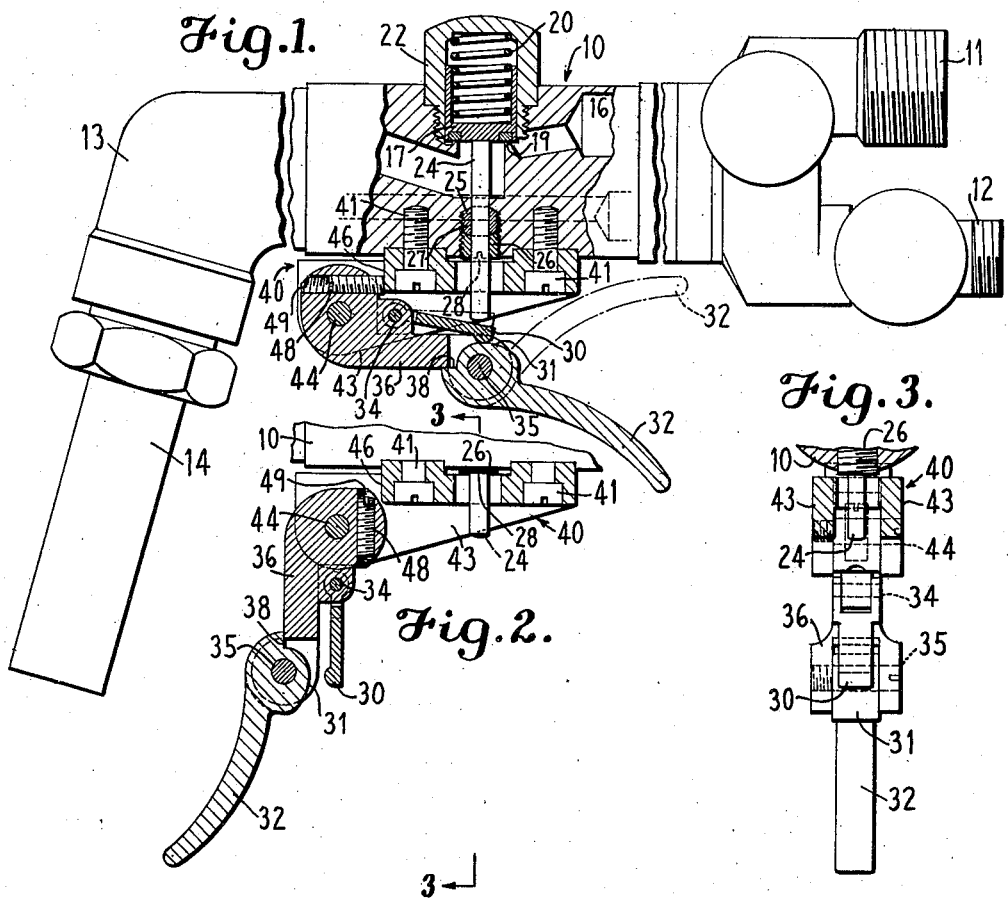
Fig. 1 is a side view, partly in section and partly broken away, showing the valve structure of the torch.
Fig. 2 is a fragmentary side view showing parts of Fig. 1 in a different position.
Fig. 3 is a fragmentary end view of the valve operating means.
Fig. 4 is a fragmentary view of a modified form of the invention.

The torch shown in Fig. 1 comprises a body with hose connections 11, 12 at one end, and a head 13 and tip 14 at the other end. There are passages for gas in the torch body including a cutting-oxygen passage 16 commanded by a valve 17. This valve is urged against a seat 19 by a closing spring 20.

The valve 17 slides in a bearing in a cap 22 that is threaded into the valve body and can be removed when the valve needs to be cleaned or replaced. A valve rod 24 extends through the side of the torch body and through a stuffing-box 25. In the torch illustrated, this stuffing-box comprises a threaded recess in the outside of the torch body with a gland 26 which screws into the recess and compresses packing 27 around the valve rod 24.

The gland 26 has a slot 28 for receiving a tool by which the gland is turned to adjust the pressure on the packing. The rod 24 may be an integral stem extending from the valve 17, but is preferably a rod separate from the valve. When the valve 17 is moved into closed position by the spring 20, it pushes the rod 24 down into the position shown in Fig. 1.

The rod 24 is actuated to open the valve by means of a pedal 30, cam 31, and trigger 32. The pedal and trigger have pivot connections 34, 35, respectively, with a lever 36. The pivot of the trigger 32 is so located that the cam 31 formed on the hub of the trigger comes under the end of the pedal 30. A rounded protuberance on the under side of the pedal serves as a cam-follower. The shape of the cam is such that counter-clockwise rotation of the cam 31 moves the rod 24 progressively higher until the trigger 32 approaches the end of its movement, the position shown in dotted lines in Fig. 1. The cam has a peak followed by a portion permitting some retrogression of the rod 24 just before the trigger 32 reaches the end of its movement so that the valve 17 locks in open position. The peak of the cam is omitted if the locking of the valve in wide open position is not desired.

A shoulder 38 at one end of the cam surface 31 strikes against the lever 36 and limits clockwise movement of the trigger to the full-line position shown in Fig. 1.

A bracket 40 is fastened to the body portion of the torch by screws 41 and there is an opening through this bracket exposing the stuffing-box 25. The bracket 40 has downwardly extending sides 43 on opposite sides of the lever 36, and the lever is joined to the bracket by a pivot connection comprising a screw 44 extending through the lever and through the sides 43 of the bracket.

The lever 36 is in the form of a bell-crank, and the upstanding arm is curved at its upper end to clear the upper portion of the bracket 40, specifically the end face 46. A limit-screw 48 in a threaded opening 49 can be advanced to a position where it contacts with the end face 46, as shown in Fig. 1, and prevents the lever 36 from rotating clockwise, that being the direction in which the force of opening the valve tends to turn the lever 36.

When the limit-screw 48 is backed into the opening 49, the upper end of the bell-crank lever 36 can clear the end face 46 and the lever is free to swing into the position shown in Fig. 2. With the parts in this position, the stuffing-box 25 is exposed and the gland 26 can be turned to adjust the pressure on the packing, or removed to permit replacement of the packing when necessary. The parts are restored to the position shown in Fig. 1 by merely swinging the lever 36 counter-clockwise until the pedal 30 touches the lower end of the valve rod 24 and then advancing the limit-screw 48 until it touches or almost touches the end face 46.

Since it is important for the valve 17 to close tight, it is advantageous to adjust the limit-screw 48 so that when it is in contact with the end face 46 there is some clearance between pedal 30 and the end of the valve rod 24. This clearance or "lost motion" may be made very small, but unless there is some clearance there is danger that the valve 17 will be held open or prevented from being stressed against its seat with sufficient pressure to prevent leakage. As the valve or seat wears, the limit-screw 48 can be backed away from the end face 46 to permit the further downward movement of rod 24 and thereby insure tight closing of the valve. The limit-screw 48 has a slow pitch and fits the opening 49 tightly enough to be held by friction in any set position.

Fig. 4 shows a modified form of the invention in which the valve rod 24 is actuated by a lever 36' supported by a screw 44' from the bracket 40 in the same manner as the lever 36 of Figs. 1–3. A limit-screw 48' and an opening 49' through which it threads in the upstanding end of the lever 36' are similar to the screw 48 and opening 49 of the structure shown in Figs. 1–3.

The screw 48' is an adjustable abutment means for limiting the downward movement of the lever 36', but when the limit-screw 48' is backed into the opening 49' far enough to clear the end face 46, as the lever 36' swings about its pivot screw 44', the lever 36' is free to drop into the position indicated by dotted lines in Fig. 4. With the lever 36' in this dotted-line position the gland 26 of the stuffing-box is conveniently accessible.

It is an advantage of the invention that parts are removed from the torch in effecting the adjustments described. Even with careful handling there is danger of small parts, such as screws, being dropped and lost when it is necessary to partially disassemble a torch in order to effect adjustments. Play or lost motion of the valve-operating lever 36' can be adjusted with great accuracy by means of the screw 48'.

Two embodiments of the invention have been described but others can be made and those illustrated can be modified and changed without departing from the invention defined in the claims.

I claim:

1. In a torch, a body portion containing a valve which controls the passage of gas through the torch, a stuffing-box, a valve rod extending through the stuffing-box and body portion of the torch, spring means urging the valve into closed position, and manually operated means for pushing the rod in a direction to open the valve including a lever which has a pivot connection with the valve body, and an abutment limiting the movement of the lever as it swings away from the valve, said abutment being movable into an ineffective position so that the lever can swing away from the rod and expose the stuffing-box for convenient adjustment or replacement of the packing.

2. In a torch having a valve-operating rod extending through a stuffing-box, and a lever pivotally connected with the body of the torch and operable to move the rod to open the valve, a stop and a screw, one of which is on the lever and the other on the torch body in such relation that they limit the movement of the lever away from the stuffing-box when the screw is in one position and leave the lever free to swing clear of the stuffing-box with the screw in another position.

3. In a torch having a body in which is a valve and a spring urging the valve into closed position, a rod extending through the wall of the torch body and into contact with the valve, and means for thrusting the rod axially to push the valve open including a lever which is outside of the torch body and extends across the end of the rod, a fixed pivot on which the lever oscillates in such relation to the valve-operating rod that angular movement of the lever in one direction about said pivot displaces the rod and opens the valve, a bracket rigidly connected to the torch body and serving as a fixed support for said pivot, a limiting-screw which serves as an abutment to stop the movement of the lever away from the end of said rod, and threads in which said limiting-screw is movable to change the position at which it stops the lever.

4. In a torch having a valve-operating rod extending through a stuffing-box on the side of the torch, a lever and a pivot connecting the lever to the body of the torch in such position that the lever extends across the outside end of the valve rod and movement of the lever toward the torch body operates the rod to move the valve, and a limit-screw operable in one position to limit the movement of the lever away from the valve but movable into another position which leaves the lever free to swing clear of the rod and stuffing-box.

5. In a torch having a valve-operating rod extending through a stuffing-box on the side of the torch, valve-operating means including a lever, a pivot connection joining the lever with the body of the torch, a limit-screw adjustable to limit the pivotal movement of the lever away from the valve, said screw being movable into an ineffective position that leaves the lever free to swing away from the valve rod.

6. In a torch having a body portion containing a valve, a valve rod extending through a stuffing-box and the side of the body portion of the torch, a lever, a pivot connection between said lever and said body portion, a second lever comprising a trigger with a cam surface for operating the valve rod, a pivot connection between the trigger and the first lever for supporting said trigger, and a limit-screw confining the pivotal movement of the first lever to a position where the cam of the second lever is in cooperative relation with the end of the valve rod, said limit-screw being movable into an ineffective position so that the first lever can swing on its pivot to remove the trigger and its supporting means from the vicinity of the valve rod and the stuffing-box through which the rod extends.

7. In a torch having a body in which is a valve and having a stuffing-box on one side of the torch body and a valve rod extending through the stuffing-box, the combination of valve-operating means including a pedal which contacts with the end of the rod to push the rod inward and open the valve, a lever to which the pedal is pivotally connected, a pivot connection between the lever and the body of the torch, an abutment screw which limits pivotal movement of the lever in a direction to take the pedal away from the valve rod, and a trigger connected to the lever below the pedal and operable to move the pedal and displace the valve rod, said abutment screw being movable into a position that releases the lever for swinging movement away from the valve rod and stuffing-box.

8. In a torch having a body portion in which is a valve, a valve rod extending through the stuffing-box, a shoulder on the side of the torch body, valve-operating means including a bell-crank, a pivot connecting the bell-crank with the torch body, one arm of the bell-crank being shaped to pass said shoulder when the bell-crank turns on said pivot, and a limit-screw carried by the bell-crank and movable into a position to contact with the shoulder to limit the movement of the bell-crank in the direction it moves as the valve closes.

9. In a torch body containing a valve and a valve rod extending from the torch body, and a stuffing-box through which the rod passes, of valve-operating means that contacts with and displaces the valve rod, a support for said valve-operating means, a pivot connection joining the support and the torch body so that the valve-operating means can swivel clear of the valve rod and stuffing-box, and a limit-screw determining the maximum position of the valve mechanism away from the valve.

GEORGE L. WALKER.